UNITED STATES PATENT OFFICE.

FERDINAND A. LOBERT, OF NATIONAL CITY, CALIFORNIA.

COMPOSITION OF MATTER.

SPECIFICATION forming part of Letters Patent No. 667,786, dated February 12, 1901.

Application filed April 5, 1900. Serial No. 11,767. (No specimens.)

*To all whom it may concern:*

Be it known that I, FERDINAND A. LOBERT, a citizen of the United States, residing at National City, in the county of San Diego and State of California, have invented certain new and useful Improvements in Composition of Matter; and I do declare the following to be a full, clear, and exact description of the invention, such as will enable others skilled in the art to which it appertains to make and use the same.

The invention relates to a composition of matter particularly designed for the manufacture of pipes or tiles.

The object of the invention is to provide a compound which when properly shaped to form the article desired will be indestructible by heat or cold and impervious to water.

The invention consists of a compound composed of sulfur, rock-asphaltum, ground sea-shells, algæ, raw cement, and coal-tar, combined substantially in the following proportions: sulfur, two ounces; rock-asphaltum, four ounces; ground sea-shells, four ounces; algæ, one-quarter of an ounce; California raw cement, (a natural product,) four ounces; coal-tar, one-eighth of an ounce. These ingredients are combined and subjected to a gentle heat until they become thoroughly mixed or incorporated and form a stiff batter. While in this condition the mass is discharged into a mold and allowed to harden.

The cement employed by me as an ingredient of this composition is a natural product found near the bay of San Diego, California. It is dug out of the earth and used in its raw state or without refining, and I have found its use of great value. The cement is hydraulic in character, grayish in color, of a granular texture, and has a slight metallic luster. Unlike Portland or like hydraulic cements, however, it does not when mixed with other ingredients sink to the bottom, but spreads uniformly throughout the mass. I mix the algæ with this natural cement to adapt the latter to effectively stand a high degree of heat and pressure.

Articles formed of this composition are unaffected by either fresh or salt water and are practically indestructible.

Having thus described the invention, what is claimed, and desired to be secured by Letters Patent, is—

The composition of matter resulting from the mixture of sulfur, asphaltum, sea-shells, algæ, the cement named, and coal-tar, in substantially the proportions set forth.

In testimony whereof I have hereunto set my hand in presence of two subscribing witnesses.

FERDINAND A. LOBERT.

Witnesses:
 GEO. W. BEERMAKER,
 GEORGE W. BOWLER.